United States Patent

[11] 3,599,825

| [72] | Inventor | Svend M. Jorgensen |
| --- | --- | --- |
| | | Tenafly, N.J. |
| [21] | Appl. No. | 841,826 |
| [22] | Filed | July 15, 1969 |
| [45] | Patented | Aug. 17, 1971 |
| [73] | Assignee | Foster Wheeler Corporation |
| | | Livingston, N.J. |

[54] PRESSURE VESSEL WITH SEAL RING CONSTRUCTION
19 Claims, 4 Drawing Figs.

| [52] | U.S. Cl. | 220/46 |
| --- | --- | --- |
| [51] | Int. Cl. | B65d 53/00 |
| [50] | Field of Search | 220/46, 55 |

[56] References Cited
UNITED STATES PATENTS

| 3,159,302 | 12/1964 | Latham et al. | 220/46 |
| --- | --- | --- | --- |
| 3,464,581 | 9/1969 | Polcer | 220/46 |

Primary Examiner—George T. Hall
Attorneys—John E. Wilson, John Maier, III and Marvin A. Naigur ABSTRACT: A pressure vessel including an open-ended first vessel member, and a second vessel member having at least a portion thereof extending into the open end of the first member and defining a circular space with the inner wall of the first member. A plurality of sealing rings are disposed in the space and are compressed to provide a seal between the members.

INVENTOR.
SVEND M. JORGENSEN

INVENTOR.
SVEND M. JORGENSEN

PRESSURE VESSEL WITH SEAL RING CONSTRUCTION

BACKGROUND OF THE INVENTION

This invention relates to a fluid container such as a pressure vessel and, more particularly, to such a fluid container having an improved seal provided between the container and a closure plug for the container.

The most common type of fluid container that requires a seal between it and its closure plug is in the form of a pressure vessel. In medium size pressure vessels a "Bridgeman" seal is normally utilized, in which one or more sealing rings are provided in a notch formed in the closure plug, and a threaded bolt is adapted to apply an axially extending inwardly directed pressure on the sealing rings. However, in this arrangement any relative movement between the closure plug and the vessel as a result of poor machining tolerances, etc., affects the quality of the seal. Also the entire hydrostatic load on the closure plug is directed through the seal, and, as a result, the sealing surface of the seal ring must be increased in proportion to any increase in the diameter of, or the pressure in, the vessel, in order to avoid crushing of the seal ring. For increasing diameters and pressures, the seal ring eventually increases to such a size that it becomes extremely difficult to produce an initial seal. Furthermore, the size of the bolting utilized to apply the above mentioned inwardly extending axially directed pressure must be of such a size that it is often necessary to thicken the ends of the forged vessels to a degree that is generally costly and impractical.

SUMMARY OF THE INVENTION

It is therefore an object of the present invention to provide a pressure vessel or other fluid container having a seal between it and its closure plug which is unaffected by relative movement between the closure plug and the vessel.

It is a further object of the present invention to provide a pressure vessel of the above type in which crushing of the sealing rings is minimized, without requiring an increase in the size of the end forgings, or other parts of the vessel.

Briefly summarized, the present invention comprises a first container member having an open end, a second container member having at least a portion thereof extending into said open end, and defining a circular space with the inner wall of said first container member, sealing means disposed in said space and adapted to engate each of said container members, and means to compress said sealing means to provide a seal between said members.

BRIEF DESCRIPTION OF THE DRAWINGS

Reference is now made to the accompanying drawings for a better understanding of the nature and objects of the pressure vessel of the present invention, which drawings illustrate the best mode presently contemplated for carrying out the objects of the invention and its principles, and are not to be construed as restrictions or limitations on its scope. In the drawings.

DESCRIPTION OF THE PREFERRED EMBODIMENTS

Figure 1:
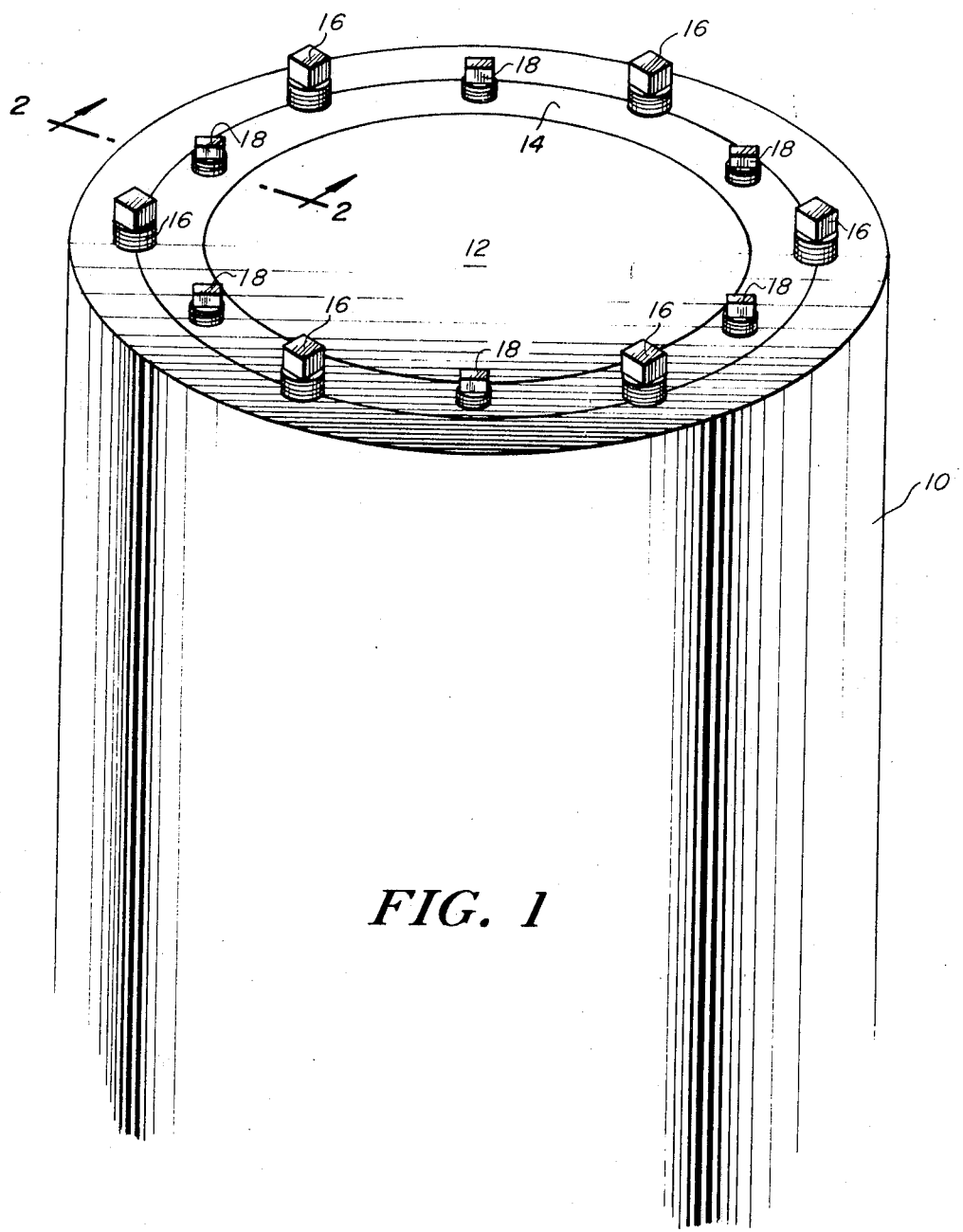
FIG. 1 is a perspective view of a pressure vessel according to the present invention.
Figure 2:
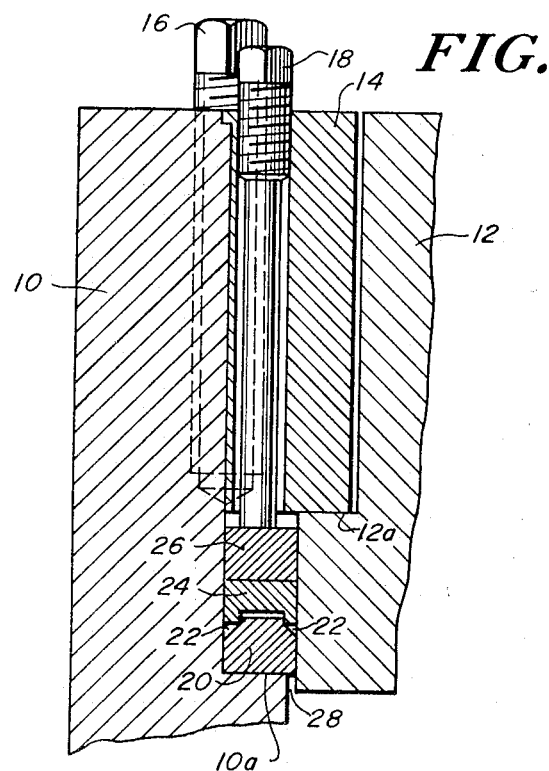
FIG. 2 is a fragmentary cross-sectional view taken along the line 2—2 of FIG. 1.

Referring specifically to the embodiments of FIGS. 1 and 2, the reference numeral 10 refers to a fluid container which may be in the form of a cylindrical pressure vessel having an open upper end which is adapted to be closed by means of a closure plug 12. The closure plug 12 has an outer diameter which is slightly less than the inner diameter of the vessel 10 and when inserted into the vessel, is adapted to extend flush with the upper end of the vessel.

A counterbore is formed in the upper end of the vessel 10 and, together with a notch formed in the upper portion of the outer surface of the plug 12, defines a circular space adapted to accommodate a retainer ring 14.

The upper end of the retainer ring 14 extends flush with the corresponding ends of the vessel 10 and the closure plug 12, and the bottom portion of the retainer ring engages a shoulder 12a forming the lower boundary of the notch in the closure plug 12, as shown in FIG. 2.

A plurality of threaded shear studs 16 are disposed in a plurality of circularly spaced bores extending around the interface formed between the vessel wall and the retainer ring, to secure the retainer ring with respect to the vessel.

A plurality of circularly spaced pullup bolts 18 extend axially through the retainer ring 14, each bolt having a head portion extending outwardly from the end of the vessel 10, and an upper threaded portion threadedly engaging a tapped bore formed in the ring 14, which enables the bolt to be moved axially with respect to the vessel.

A set of sealing rings is disposed in the circular spaced between the wall of the counterbore in the vessel 10 and the outer surface of the plug 12, and includes a floating ring 20 which rests on a shoulder 10a forming the lower boundary of the counterbore. A pair of tapered shoulders are provided on the ring 20, each of which is adapted to receive a seal ring or gasket 22. A pressure ring 24 is provided in contact with the upper portions of the seal rings 22, and has a notch formed therein which is adapted to receive the reduced end portion of the floating ring 20. A backup ring 26 is provided in engagement with the pressure ring 24 and is engaged by the pullup bolt 18 so that it can distribute the axial pressure provided by the latter uniformly over the pressure ring 24, and therefore uniformly compress the seal rings 22 to establish an initial seal between the vessel wall and the plug. In their compressed position shown in FIG. 2, all of the rings with the exception of one seal ring 22 extend slightly outwardly from the inner wall of the vessel 10 in engagement with the closure plug 12. The latter ring, of course, sealingly engages the inner wall of the above-mentioned counterbore.

In assembly, the rings are inserted in the counterbore and the plug 12 is inserted into the open end of the vessel 10, it being understood that the plug may have fingers, a shoulder, or the like, adapted to engage the vessel 10 to retain the closure plug in a predetermined axial position with respect to the vessel. The retainer ring 14 is then inserted in the circular space between the inner wall of the counterbore formed in the vessel and the outer surface of the plug. The shear studs 16 are then threaded into their corresponding bores to secure the retaining ring with respect to the vessel, and the pullup bolts 18 are threaded into their respective bores and adjusted in an axial direction to provide the requisite amount of pressure on the seal rings 22, to compress same and thus establish an initial seal between the vessel wall and the plug.

After the components have been assembled in the above manner, a great majority of the hydrostatic load in the vessel, caused by the internal fluid pressure therein, is taken up by the closure plug, which, in turn, transmits the load to the wall of the vessel 10 via the shoulder 12a, the retainer ring 14, and the shear studs 16. A gap 28 is provided between the plug 12 and the inner wall of the vessel 10 to connect the circular space in which the rings are disposed with the interior of the vessel, so that the floating ring 20 receives a small portion of the hydrostatic load which acts in an axial direction opposite to the direction of the axial pressure provided by the pullup bolts 18, and thus further compresses the seal rings 22.

It is noted that any relative movement between the closure plug 12 and the vessel 10 due to poor machining tolerances, etc., will not effect the quality of the seal, nor crush the seal rings 22.

Figure 3:
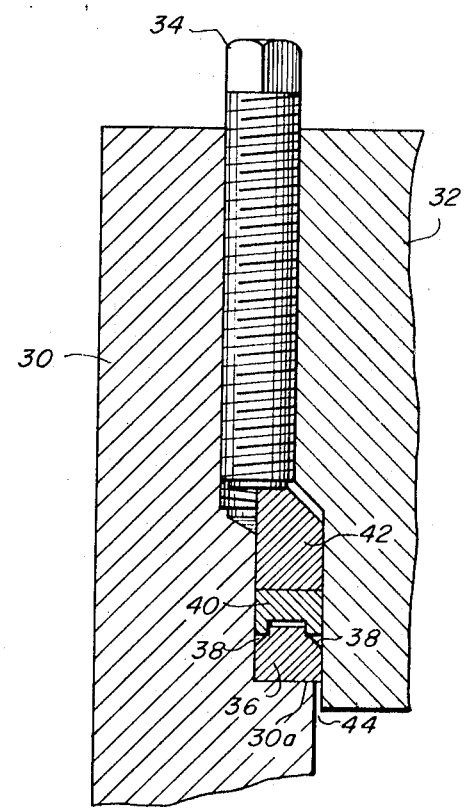
FIG. 3 is a view similar to FIG. 2, but showing another embodiment of the present invention.

In the embodiment of FIG. 3 a pressure vessel 30 is adapted to accommodate a closure plug 32. The inner wall of the vessel is counterbored to a slightly greater diameter than the plug, and a plurality of threaded shear studs 34 are provided in bores formed along the interface between the vessel wall and the outer surface of the plug. It is understood that the bores are spaced circularly around the interface, as in the previous embodiment.

The lower portion of the plug 32 is of a reduced diameter and, together with the bottom portion of the counterbore formed in the wall of the vessel 30, defines a circular space which receives a plurality of sealing rings. In particular a floating ring 36 rests on a shoulder 30a which forms the bottom boundary of the counterbore, and the ring has two tapered shoulder portions which accommodate a pair of seal rings 38. A pressure ring 40 and a backup ring 42 are also provided which function in an identical manner to the pressure ring and backup ring of the previous embodiment. These latter rings, along with the floating ring 36 and one of the seal rings 38 extend outwardly from the counterbore in engagement with the reduced portion of the plug 32. The other seal ring is in engagement with the inner wall of the counterbore.

As in the previous embodiment, after the components have been assembled, a great majority of the hydrostatic load is taken up by the closure plug 32 which transmits the load to the wall of the vessel 30, via the shear studs 34. In addition to this function, the shear studs can be axially adjusted relative to the vessel and plug to provide the requisite axial pressure on the seal rings 38 to effect the initial seal.

A gap 44 is also provided between the plug 32 and the inner wall of the vessel 30 so that the floating ring 36 receives a small portion of the hydrostatic load which acts against the pressure provided by the shear studs 38 to further compress the seal rings. As in the previous embodiment, relative movements between the plug and the vessel will not effect the quality of the seal.

Figure 4:
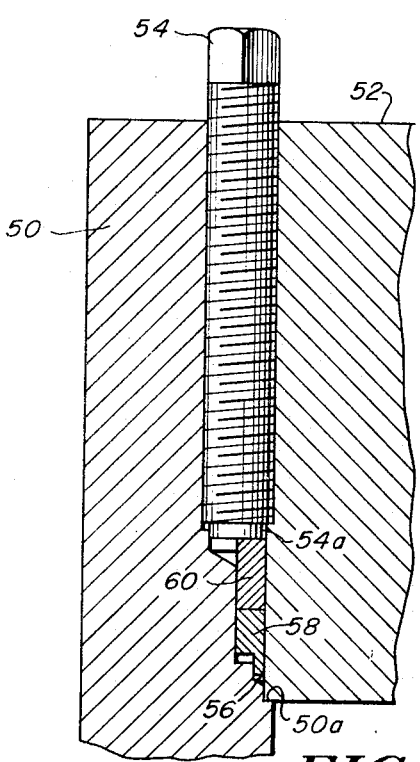
FIG. 4 is a view similar to FIG. 2, but showing still another embodiment of the present invention.

In the embodiment of FIG. 4, a pressure vessel 50 accommodates a closure plug 52 with a plurality of threaded shear studs 54 being spaced circularly around the interface between the inner wall of the vessel 50 and the outer surface of the closure plug 52, as in the previous embodiment.

A seal ring 56, a jack ring 58, and a backup ring 60 are fitted within the circular space defined by grooves formed in the vessel wall and in the outer surface of the plug. The backup ring 60 is engaged by a reduced end 54a of the shear stud 54 so that the shear stud acts both to transmit the hydrostatic load from the closure plug 52 to the vessel wall 50, and to provide an initial pressure on the seal provided by the rings 56, 58 and 60.

It is noted that, in this embodiment, an end of the plug 52 rests against a shoulder 50a of the vessel 50 to define the lower limit of the movement of the plug with respect to the vessel.

It is understood that the features of the present invention can also be applied to other environments, such as a joint between two shell portions which together form a cylindrical pipe, vessel, or the like, and that variations of the specific construction and arrangement of the embodiments disclosed above can be made by those skilled in the art without departing from the invention as defined in the appended claims.

I claim:

1. A fluid container comprising a first container member having an open end, a second container member having at least a portion thereof extending into said open end and defining an annular space with the inner wall of said first container member, sealing means disposed in said space and adapted to engage each of said container members, at least one bolt member threadably engaging said first container member and adapted to apply an axially extending pressure to said sealing means to compress said sealing means and provide a seal between said members, and means connecting the interior of first container member and said space so that the internal fluid pressure in said first container member acts on a portion of said sealing means in a axial direction opposite to said axially extending pressure, said second container member being movable relative to said first container member without affecting said seal.

2. The container of claim 1 wherein said first container member is in the form of a pressure vessel, and said second container member is in the form of a closure plug for said vessel.

3. The container of claim 1 wherein said means to compress said sealing means is adapted to transmit the internal fluid pressure acting on said second containermember to the walls of said first container member.

4. The container of claim 1 wherein said means to compress said sealing means comprises a bolt member threadably engaging said first container member and adapted to apply an axially extending pressure to said sealing means.

5. The container of claim 1 wherein said sealing means includes a backup ring engaging said bolt member and adapted to transmit the pressure from said bolt member uniformly over the remaining portion of said sealing means.

6. The container of claim 1 wherein said sealing means is disposed in a counterbore formed in the wall of said first container member.

7. A fluid container comprising a first container member having an open end, a second container member having at least a portion thereof extending into said open end and defining an annular space with the inner wall of said first container member, sealing means disposed in said space and adapted to engage each of said container members, at least one bolt member threadably engaging said first container member and adapted to apply an axially extending pressure to said sealing means to compress said sealing means and provide a seal between said members, said bolt member also being adapted to transmit the internal fluid pressure acting on said second container member to the walls of said first container member, and passage means connecting the interior of first container member and said space so that the internal fluid pressure in said first container member acts on a portion of said sealing means in an axial direction opposite to said axially extending pressure.

8. The container of claim 7 wherein said first container member is in the form of a pressure vessel, and said second container member is in the form of a closure plug for said vessel.

9. The container of claim 7 wherein said sealing means includes a backup ring engaging said bolt member and adapted to transmit the pressure from said bolt member uniformly over the remaining portion of said sealing means.

10. The container of claim 7 wherein said sealing means is disposed in a counterbore formed in said first container member.

11. A fluid container comprising a first container member having an open end, a second container member having at least a portion thereof extending into said open end and defining an enclosed circular space with the inner wall of said first container member, sealing means disposed in said space and adapted to engage each of said container members, means to compress said sealing means in a first axial direction to provide a seal between said members, and means connecting the interior of said first member and said space so that the internal fluid pressure in said first container member acts on said sealing means in an axial direction opposite to said first axial direction.

12. The container of claim 11 wherein said first container member is in the form of a pressure vessel, and said second container member is in the form of a closure plug for said vessel.

13. The container of claim 12 wherein the outer surface of said closure plug is spaced from the inner wall of said pressure vessel to connect the interior of said vessel and said space.

14. The container of claim 11 wherein said means to compress said sealing means comprises a bolt member threadably engaging said first container member and adapted to apply a pressure to said sealing means in said axial direction.

15. The container of claim 14 wherein said sealing means includes a backup ring engaging said bolt member and adapted to transmit the pressure from said bolt member uniformly over the remaining portion of said sealing means.

16. The container of claim 11 wherein said sealing means is disposed in a counterbore formed in said first container member.

17. A fluid container comprising a first container member having an open end, a second container member having at least a portion thereof extending into said open end and defining an annular space with the inner wall of said first container member, a retainer ring disposed in one portion of said annular space, means for fastening said retainer ring to said first container member, sealing means disposed in another portion of said annular space and adapted to engage each of said container members, and means engaging said retainer ring in a spaced relation to said fastening means for compressing said sealing means to provide a seal between said members.

18. A fluid container comprising a first container member having an open end and a counterbore at said open end, a closure plug member extending into said open end and having an annular notch defining an annular space with said counterbore, sealing means disposed in said space and adapted to engage each of said members, and at least one bolt extending in the interface between said container members and said plug member and adapted to fasten said members and compress said sealing means to provide a seal between said members.

19. The container of claim 18 further comprising means connecting the interior of first container member and said space so that the internal fluid pressure in said first container member acts on a portion of said sealing means in an axial direction opposite the pressure applied by said bolt.